Patented Jan. 1, 1924.

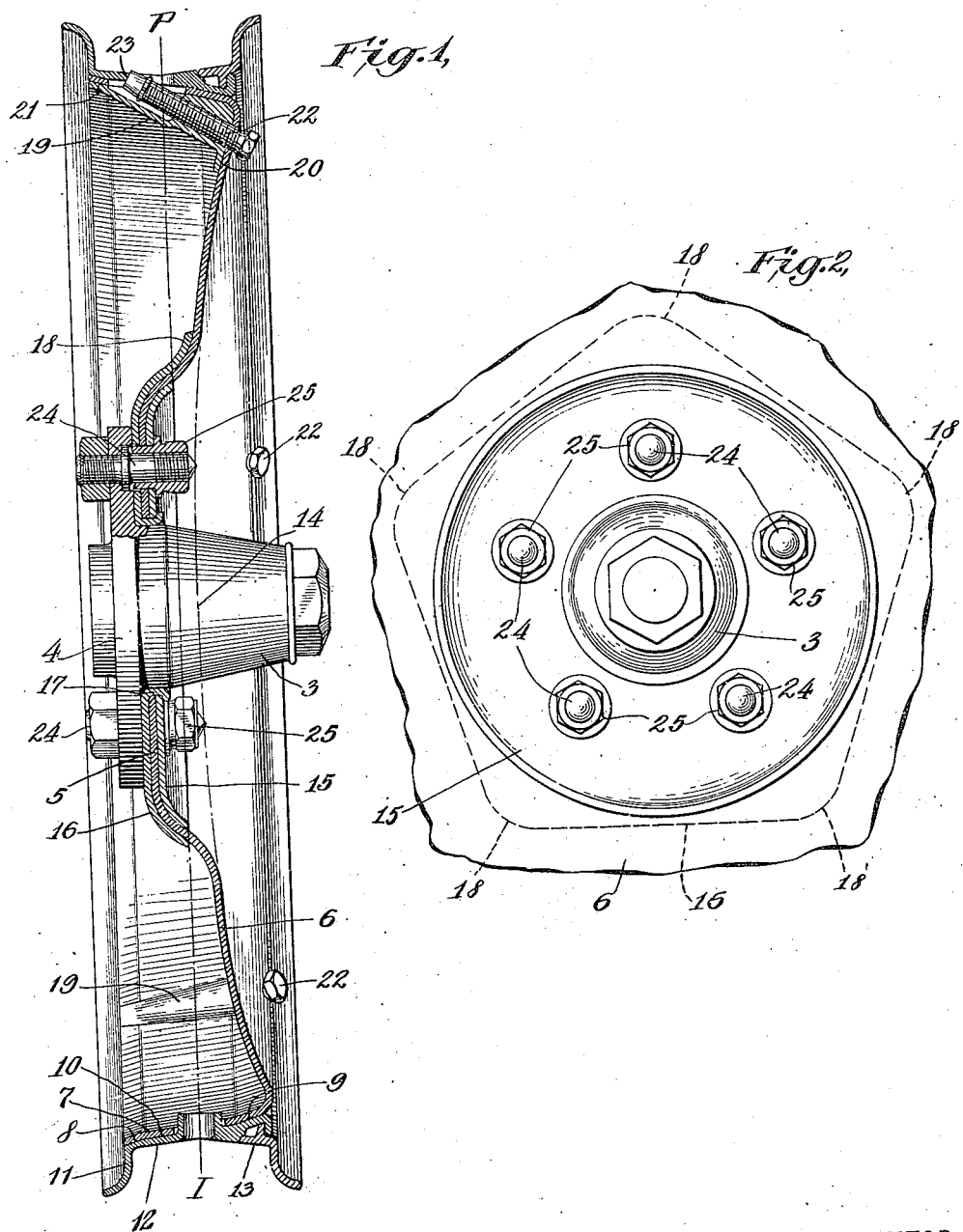

1,479,482

UNITED STATES PATENT OFFICE.

SYDNEY I. PRESCOTT, OF NEW YORK, N. Y., AND FRANCIS J. RUMMLER, OF LYNDHURST, NEW JERSEY.

WHEEL.

Application filed February 13, 1922. Serial No. 536,043.

*To all whom it may concern:*

Be it known that we, SYDNEY I. PRESCOTT and FRANCIS J. RUMMLER, citizens of the United States, respectively, residing in the city, county, and State of New York, and the town of Lyndhurst, county of Bergen, and State of New Jersey, have invented a new and useful Improvement in Wheels, of which the following is a specification.

This invention relates to an improvement in wheels, particularly to pressed steel wheels of the disc type.

In our co-pending application, Serial No. 344282, filed December 12, 1919, there is disclosed a standardized or universal wheel in the use of which a tire may be changed alone, or with its rim as a unit, or with its rim and wheel body as a unit, and which eliminates the necessity heretofore existing for the manufacture of numerous sizes of three distinct types of wheels, and possesses numerous other advantages peculiar to itself. The main object of the present invention is the production of an improved wheel of this standardized or universal type, possessing the further advantages of fewer parts, increased lightness—particularly rim lightness, increased resiliency, increased strength, faster and easier rim operation, improved vibration control, and lower cost. With these and other objects not specifically mentioned in view, the invention consists in certain constructions and combinations which will be hereinafter fully described and then specifically set forth in the claims hereunto appended.

In the accompanying drawings, which form a part of this specification and in which like characters of reference indicate the same or like parts, Fig. 1 is a cross-sectional view of a wheel constructed in accordance with the invention; and Fig. 2 is a fragmentary detail side view showing one of the vibration control devices illustrated in Fig. 1.

Referring to the drawings, which illustrate but one of many possible concrete embodiments of the invention, 3 indicates a hub provided with a disc mounting flange 4, the outer face of which lies inboard from the plane of impact indicated by the line P—I in Fig. 1. The purpose of thus locating the hub flange is to give the wheel as a whole a dish of approximately 2 degrees whereby it is strengthened against the greatest lateral stresses developed in road use. It may be here remarked that the term "inboard," as used herein, means toward the center of the vehicle on which the wheel is used, and "outboard" means away from the same.

Mounted on the hub 3 is a disc which, as shown, has a central section 5 integral with and reversely curved outboard into a saucer-shaped mid-section 6 integral with and curved inboard into a rim supporting section generally indicated by the reference character 7. By an inspection of Fig. 1, it will be seen that the reversely curved portion of the disc crosses the plane of impact, that the saucer-shaped mid-section lies outboard from said plane of impact, and that the rim engaging section re-crosses the said plane. The rim engaging section is further distinguished by having an inboard rim supporting surface 8, and an outboard rim supporting surface 9, of substantially equal angularity; and it also has an intermediate surface 10 of lesser angularity.

Seated on the rim engaging section 7 is a quick-detachable demountable rim 11 having bearing surfaces the angularity of which corresponds to the angularity of the rim supporting surfaces 8, 9, and 10. This rim has an inboard tire supporting surface 12 of substantially the same angularity as the intermediate surface 10, and also has an outboard tire supporting surface 13 of equal but reversed angularity. The particular purpose of so forming the tire supporting surfaces of the demountable rim 11 is to make easier the removal of a tire which has become rusted to the rim, as fully explained in our co-pending application Serial No. 534,975, filed February 8, 1922.

At 14 the crown of the projective radial curvature of the saucer-shaped mid-section 6 lies outboard from the central section 5 before referred to, and at the axis of the wheel. The disc is shaped as above described in order to make the wheel resilient and easy riding while more effectually absorbing radial shock and more effectually resisting side stresses. This shape, however, by permitting disc yield in some degree, invites excessive vibration. To prevent development of this excessive vibration and the crystallization and wheel breakage which may follow the same, there is provided means united with the disc and acting to control its vibration. This vibration controlling means is in two parts acting respectively at the inner and outer peripheries of the disc, to establish an odd number of nodal lines and thus divide the disc into an odd number of areas incompatible with vibration wave propagation.

With this end in view, there is provided a circular plate 15 lying outboard and against the central section 5, its outer edge terminating substantially in the plane of impact. There is further provided another plate 16 lying inboard and against the central section 5. The inner periphery of the plate 16 is swaged at 17 over the inner peripheries of the section 5 and plate 15. The plate 16 is provided with an odd number of vibration damping salients 18, of the type disclosed and fully described in our co-pending application, Serial No. 515465 filed Nov. 16, 1921. At these salients the plate 16 is spot-welded to the mid-section 6 of the disc, and the plate 15 adjacent its periphery may also be spot-welded to the disc.

There is further provided an equal odd number of vibration dampers united with the disc adjacent its outer periphery and, as shown, these dampers, marked 19, are united with the mid-section 6 by spot-welding at 20, and with the rim section 7 by spot-welding at 21. By means of these dampers, the rim section 7 is stiffened in an odd number of positions and nodal lines are thereby established which are co-incident with the nodal lines established by the union of the salients 18 with the disc.

Each of the dampers also acts as a nut in which is threaded a rim holding screw 22 thrusting against an internal abutment 23 in the rim 11.

The wheel body is held in position on the hub 3 against the flange 4 by means of a series of bolts 24 and skirted nuts 25, the latter being held by the driving or braking torque, as fully explained in our co-pending application, Serial No. 344,282 before referred to.

In the structure above described, the rim section is permitted to yield enough under road shock to give the wheel the resiliency desired for easy riding, but its tendency to develop periodic and excessive vibration is counteracted by the vibration controlling means acting to limit yielding movements to single vibrations. The peculiar form of the wheel body prevents direct transmission of radial shock to the bearings of the wheel and strongly resists side stresses in either direction. The extremely large bearing surface of the rim permits the use of a smaller number of rim holding devices and vibration dampers; the particular form of rim seat and rim results in a material saving in weight at the rim and further permits the use of smaller vibration dampers in rim holding devices, all of which reduces initial and maintenance cost.

Changes and variations within the scope of the claims may be made in the structure by means of which the invention is carried into effect. The invention therefore is not to be restricted to the precise details of the structure shown and described.

What is claimed is:

1. A disc wheel body comprising a central section inboard from the plane of impact and integral with and reversely curved outboard across said plane into a saucer-shaped mid-section outboard from said plane and integral with and curved inboard into a rim supporting section re-crossing said plane.

2. A disc wheel body comprising a central section integral with and reversely curved outboard into a saucer-shaped mid-section integral with and curved inboard into a rim supporting section, said central section being reinforced on its outboard side by a circular plate and on its inboard side by a plate having vibration damping salients.

3. A disc wheel body comprising a central section integral with and reversely curved outboard into a saucer-shaped mid-section integral with and curved inboard into a rim supporting section, said rim supporting section being reinforced at intervals by vibration damping devices permanently united therewith.

4. A disc wheel body comprising a central section integral with and reversely curved outboard into a saucer-shaped mid-section integral with and curved inboard into a rim engaging section, said rim engaging section having inboard and outboard rim supporting surfaces of substantially equal angularity and an intermediate surface of lesser angularity.

5. A disc wheel body comprising a central section integral with and reversely curved outboard into a saucer-shaped mid-section integral with and curved inboard into a rim supporting section, the crown of the projective radial curvature of said mid-section being outboard from said central section.

6. The combination with a disc wheel body comprising a central section integral with and reversely curved outboard into a saucer-shaped mid-section integral with and curved inboard into a rim engaging section said rim engaging section having inboard and outboard rim supporting surfaces of substantially equal angularity and an intermediate surface of lesser angularity, of a rim seated on said rim engaging section and having bearing surfaces of corresponding angularity.

7. The combination with a disc wheel body provided with an integral rim engaging section having inboard and outboard rim supporting surfaces of substantially equal angularity and an intermediate surface of lesser angularity, of a rim seated on said section and having bearing surfaces of corresponding angularity.

8. The combination with a disc wheel body provided with an integral rim engaging section having inboard and outboard rim supporting surfaces of substantially equal angularity and an intermediate surface of lesser angularity, of a rim seated on said section and having bearing surfaces of corresponding angularity, said rim also having an inboard tire supporting surface of substantially the same angularity as said intermediate surface and an outboard tire supporting surface of equal but reversed angularity.

In testimony whereof, we have signed our names to this specification.

SYDNEY I. PRESCOTT.
FRANCIS J. RUMMLER.